(12) United States Patent
Yanazawa et al.

(10) Patent No.: US 9,994,170 B2
(45) Date of Patent: Jun. 12, 2018

(54) EXTERIOR MEMBER END CAP AND WIRE HARNESS

(71) Applicant: Yazaki Corporation, Minato-ku, Tokyo (JP)

(72) Inventors: Kenta Yanazawa, Makinohara (JP); Takatatsu Yamamoto, Makinohara (JP); Toshihiro Nagashima, Makinohara (JP); Hideomi Adachi, Makinohara (JP); Shinichi Inao, Makinohara (JP); Hiroyuki Yoshida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days. days.

(21) Appl. No.: 15/614,736

(22) Filed: Jun. 6, 2017

(65) Prior Publication Data

US 2017/0349122 A1    Dec. 7, 2017

(30) Foreign Application Priority Data

Jun. 7, 2016  (JP) .................................. 2016-113507

(51) Int. Cl.
| | |
|---|---|
| *H01B 7/00* | (2006.01) |
| *H02G 15/013* | (2006.01) |
| *B60R 16/02* | (2006.01) |
| *H02G 3/04* | (2006.01) |
| *H02G 3/06* | (2006.01) |

(52) U.S. Cl.
CPC ....... *B60R 16/0215* (2013.01); *H02G 3/0418* (2013.01); *H01B 7/00* (2013.01); *H02G 3/0468* (2013.01); *H02G 3/0691* (2013.01); *H02G 15/013* (2013.01)

(58) Field of Classification Search
CPC .............. B60R 16/0215; H02G 3/0418; H02G 3/0468; H02G 3/0691; H02G 15/013; H01B 7/00
USPC ...................................................... 174/72 A
See application file for complete search history.

(56) References Cited

U.S. PATENT DOCUMENTS

| | | | | |
|---|---|---|---|---|
| 5,536,998 A * | 7/1996 | Sica | .................. | F21V 17/04 |
| | | | | 313/25 |
| 6,957,817 B2 * | 10/2005 | Goll | .................. | F16L 5/08 |
| | | | | 277/602 |
| 7,318,339 B2 * | 1/2008 | Nishio | ............... | G01N 27/4062 |
| | | | | 204/424 |

(Continued)

FOREIGN PATENT DOCUMENTS

JP    2011-254614 A    12/2011

*Primary Examiner* — Timothy Thompson
*Assistant Examiner* — Michael F McAllister
(74) *Attorney, Agent, or Firm* — Sughrue Mion, PLLC

(57) ABSTRACT

An exterior member end cap, to be attached to an end portion of a tubular shaped exterior member from which at least one conductive path is withdrawn, is provided. The exterior member end cap includes a cap main body and a first sealing member. The cap main body is inserted into the exterior member from the end portion so as to be disposed on an outside of the conductive path. The first sealing member has a elasticity, is disposed on an outside of the cap main body in close contact with an outer peripheral surface of the cap main body, is close contact with an inner peripheral surface of the exterior member, and has a continuous bubble structure.

6 Claims, 15 Drawing Sheets

(56) References Cited

U.S. PATENT DOCUMENTS

| | | | | |
|---|---|---|---|---|
| 7,338,215 | B2* | 3/2008 | Reynolds | G02B 6/3887 |
| | | | | 385/139 |
| 9,472,931 | B2* | 10/2016 | Maeda | H02G 3/0462 |
| 2010/0181728 | A1* | 7/2010 | Thompson | B29C 45/44 |
| | | | | 277/314 |
| 2011/0297415 | A1 | 12/2011 | Katou et al. | |
| 2015/0060134 | A1* | 3/2015 | Minami | B60R 16/0222 |
| | | | | 174/72 A |

* cited by examiner

EXTERIOR MEMBER END CAP AND WIRE HARNESS

CROSS REFERENCE TO RELATED APPLICATIONS

This application is based on Japanese Patent Application (No. 2016-113507) filed on Jun. 7, 2016, the contents of which are incorporated herein by way of reference.

BACKGROUND

The present invention relates to an exterior member end cap attached to an end portion of an exterior member. The present invention also relates to a wire harness including the exterior member end cap in its configuration.

A wire harnesses is in use for electrical connection between equipment mounted in a car. The wire harness is configured to be provided with a tubular shaped exterior member and one or a plurality of conductive paths accommodating the exterior member. The wire harness that is disclosed in Patent Document 1 below, for example, is routed to pass through a vehicle floor underside of a car. A part of the wire harness that corresponds to the vehicle floor underside is routed in a straight line. The wire harness has an elongated form. In Patent Document 1 below, the following can be appreciated with regard to the part routed in a straight line in particular. To be specific, what can be appreciated with regard to it is shaking of the conductive path in the exterior member that is attributable to vibration or the like occurring during traveling.

[Patent Document 1] JP 2011-254614 A

SUMMARY

An object of the present invention is to provide an exterior member end cap that is capable of preventing damage to a conductive path in an exterior member and a wire harness that includes the exterior member end cap in its configuration.

According to one advantageous effect of the present invention, there is provided an exterior member end cap, configured to be attached to an end portion of a tubular shaped exterior member from which at least one conductive path is withdrawn, the exterior member end cap including:

a cap main body configured to be inserted into the exterior member from the end portion so as to be disposed on an outside of the conductive path; and a first sealing member having a elasticity, disposed on an outside of the cap main body in close contact with an outer peripheral surface of the cap main body, configured to be close contact with an inner peripheral surface of the exterior member, and having a continuous bubble structure.

The cap main body may include a turning prevention portion configured to prevent the first sealing member from turning when the first sealing member is inserted into the exterior member, and the turning prevention portion may be formed on the outer peripheral surface of the cap main body.

The exterior member end cap may further include a second sealing member having elasticity and provided in a through hole formed in the cap main body, the second sealing member may be configured to fill a gap between an inner peripheral surface of the through hole and an outer peripheral surface of the conductive path in a state that the conductive path is inserted through the through hole.

The exterior member end cap may further include a fixing portion configured to be fixed with a vehicle structure when the exterior member is routed to a path in a vehicle.

The fixing portion may be formed on the cap main body.

According to another advantageous effect of the present invention, there is provided a wire harness including:

a tubular shaped exterior member;

at least one conductive path inserted into the exterior member so as to be protected by the exterior member; and the exterior member end cap as set forth in claim 1, wherein the exterior member end cap is attached to an end portion of the exterior member from which the conductive path is withdrawn, and a part of the first sealing member of the exterior member end cap is exposed from the end portion of the exterior member.

BRIEF DESCRIPTION OF DRAWINGS

FIG. 1A is a schematic diagram illustrating a routing state of a high-voltage wire harness. FIG. 1B is a schematic diagram illustrating a routing state of a low-voltage wire harness, which differs from that illustrated in FIG. 1A.

DETAILED DESCRIPTION OF EXEMPLIFIED EMBODIMENTS

In the background described above, substantial shaking of the conductive path in the exterior member that is attributable to vibration during traveling causes a coating of the conductive path to hit a tube inner surface (inner peripheral surface) of the exterior member. In a case where a shield function is given, a braid and a metal foil outside the conductive path hit the tube inner surface of the exterior member. In a case where sand or the like is mixed with an inner portion of the exterior member during the hitting, a problem arises in the form of an increase in the likelihood of damage to the coating, the braid, and the like.

Generally adopted in this regard is a structure preventing mixing of sand or the like with the space between the end portion and the conductive path by means of tape winding in the end portion of the exterior member. This structure, however, has the following problems. In a case where the tape winding is insufficient, for example, sand infiltration occurs from gaps between tapes, which leads to the damage described above. In a case where moisture has accumulated in the exterior member, it is conceivable that the moisture cannot spontaneously escape from the tape-wound part due to the presence of the tape winding. Besides, moisture being left as it is in the exterior member also leads to an increase in the likelihood of damage to the coating, the braid, and the like.

The present invention has been made in view of the circumstances described above, and an object of the present invention is to provide an exterior member end cap that is capable of preventing damage to a conductive path in an exterior member and a wire harness that includes the exterior member end cap in its configuration.

A wire harness is configured to include a tubular shaped exterior member, one or a plurality of conductive paths inserted into and protected by this exterior member, and an exterior member end cap. The exterior member end cap is attached to an end portion of the exterior member from which the conductive path is withdrawn. The exterior member end cap is configured to include a cap main body disposed on the outside of the conductive path and inserted into the exterior member and an elastic first sealing member disposed on the outside of the cap main body. The first sealing member is formed such that it is in a state where it is in close contact with an inner peripheral surface of the exterior member and an outer peripheral surface of the cap main body and has a continuous bubble structure. In the wire harness, a part of the first sealing member is exposed from the end portion of the exterior member.

Figure 1A:
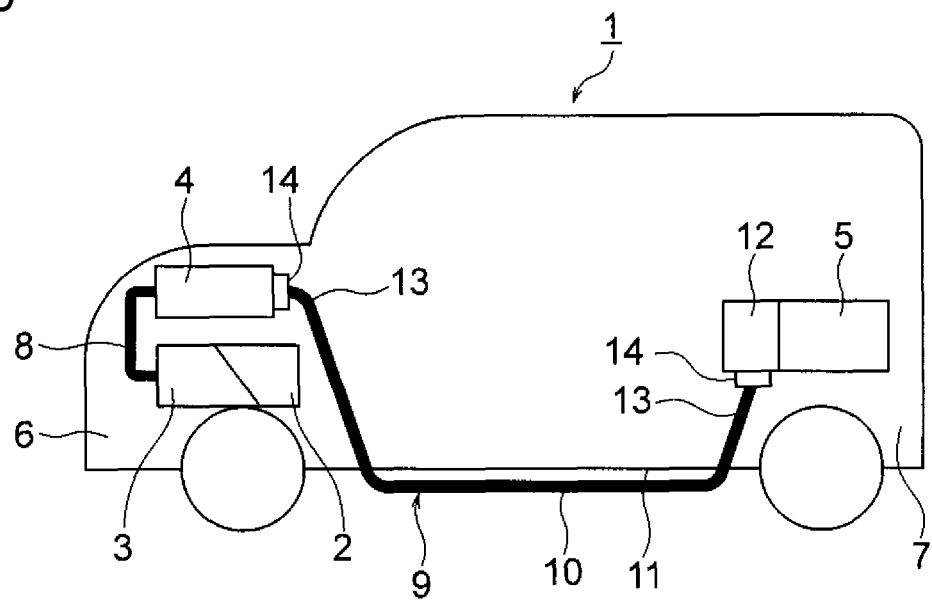
FIGS. 1A and 1B are diagrams illustrating wire harnesses according to the present invention.
Figure 1B:
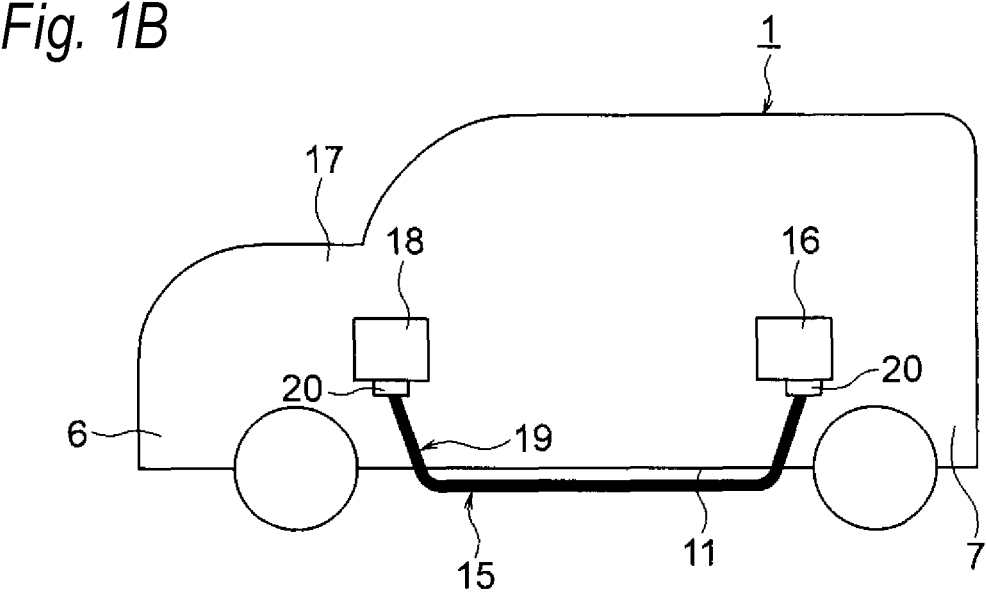
Figure 2:
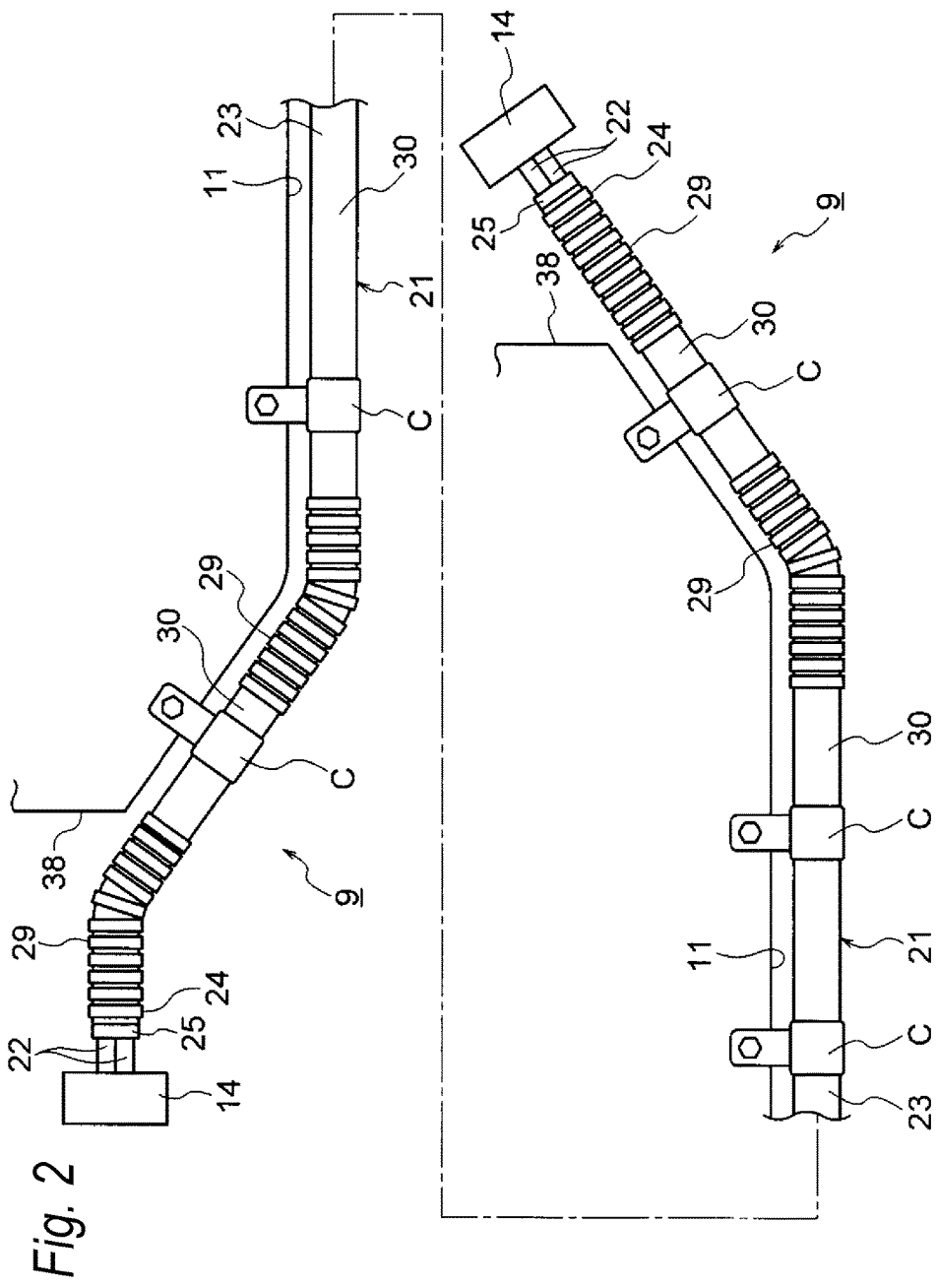
FIG. 2 is a diagram illustrating a path routing state and a configuration of the wire harness illustrated in FIG. 1A.
Figure 3:
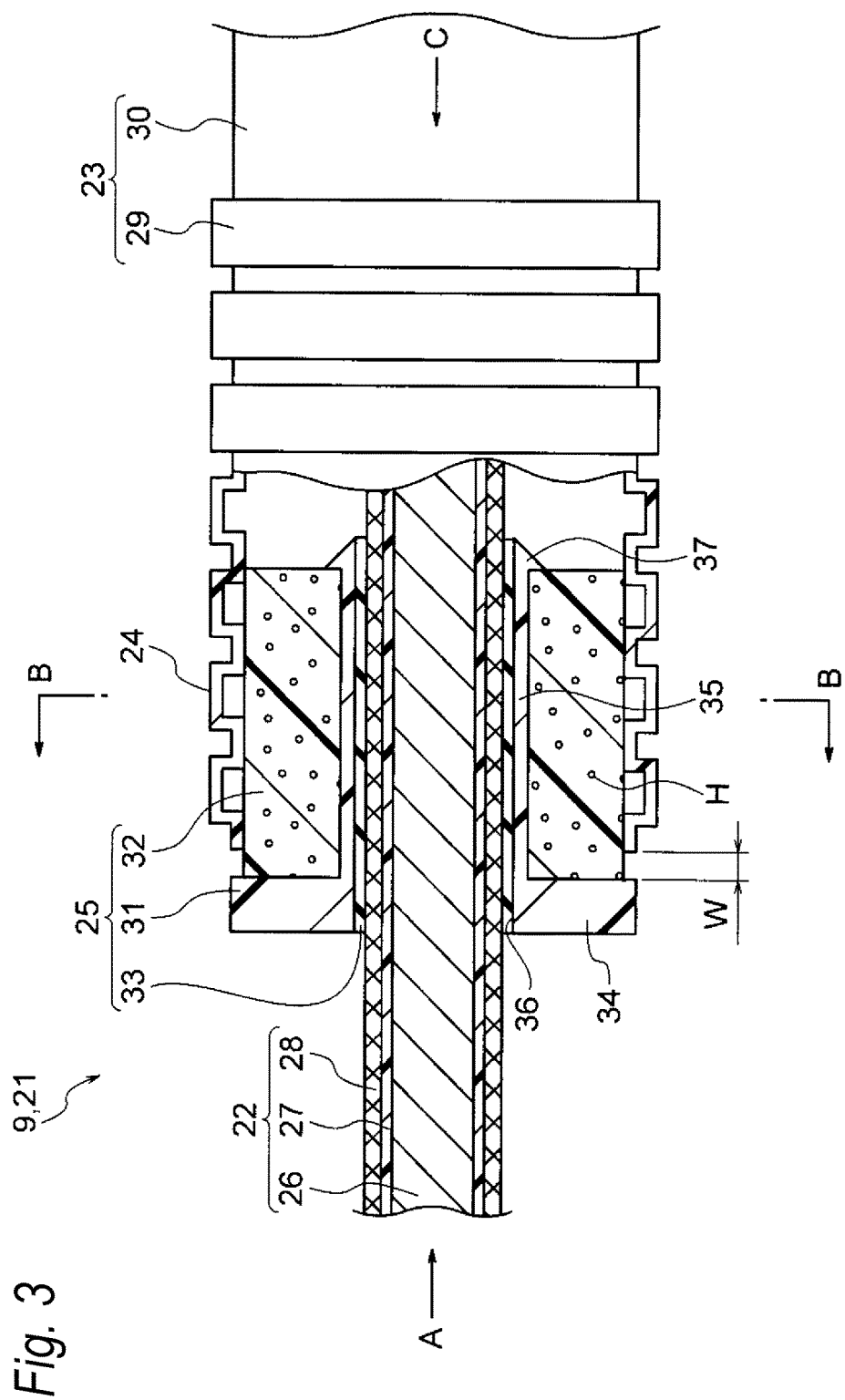
FIG. 3 is a sectional view illustrating a configuration of an exterior member end cap according to the present invention in a harness terminal illustrated in FIG. 2.

Hereinafter, a first embodiment will be described with reference to accompanying drawings. FIGS. 1A and 1B are diagrams illustrating wire harnesses according to the present invention. FIG. 1A is a schematic diagram illustrating a routing state of a high-voltage wire harness. FIG. 1B is a schematic diagram illustrating a routing state of a low-voltage wire harness, which differs from that illustrated in FIG. 1A. FIG. 2 is a diagram illustrating a path routing state and a configuration of the wire harness illustrated in FIG. 1A. FIG. 3 is a sectional view illustrating a configuration of an exterior member end cap according to the present invention in a harness terminal illustrated in FIG. 2.

Figure 4:
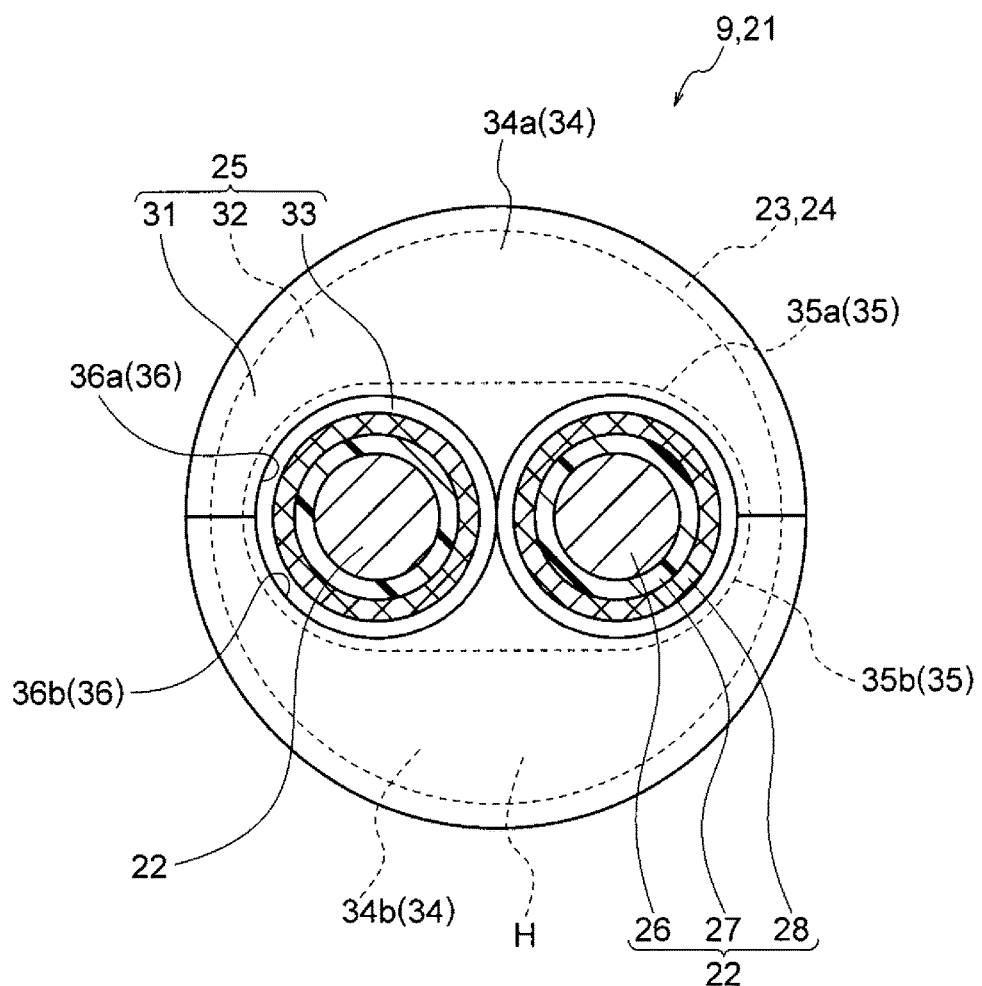
FIG. 4 is a view seen from an arrow A direction of FIG. 3.
Figure 5:
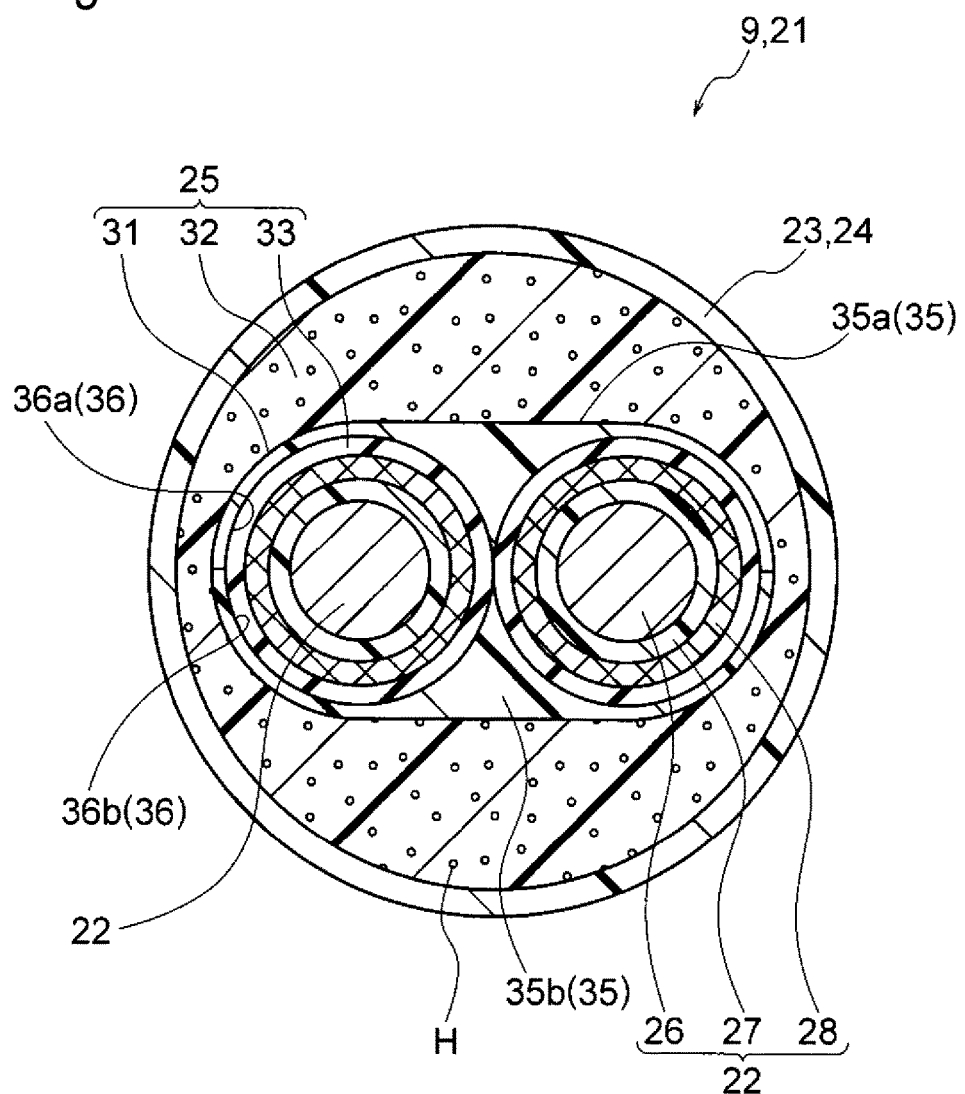
FIG. 5 is a sectional view taken along line B-B of FIG. 3.
Figure 6:
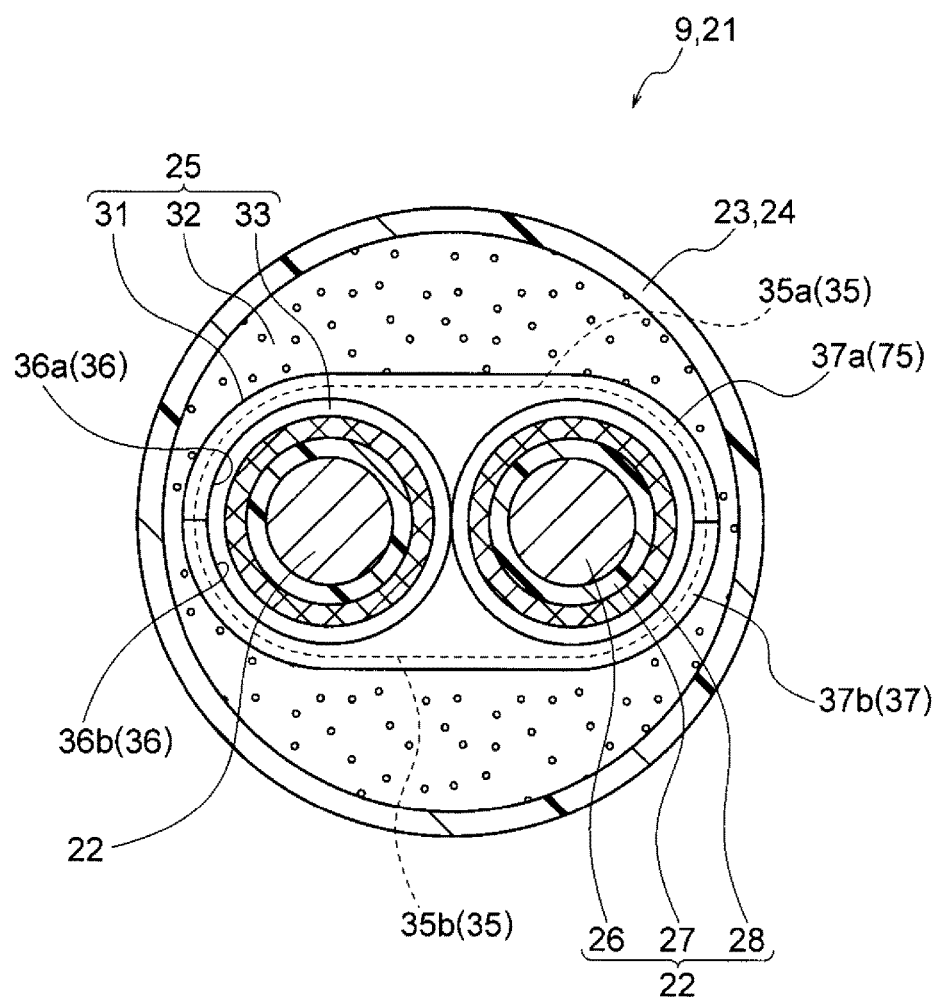
FIG. 6 is a view seen from an arrow C direction of FIG. 3.
Figure 7:
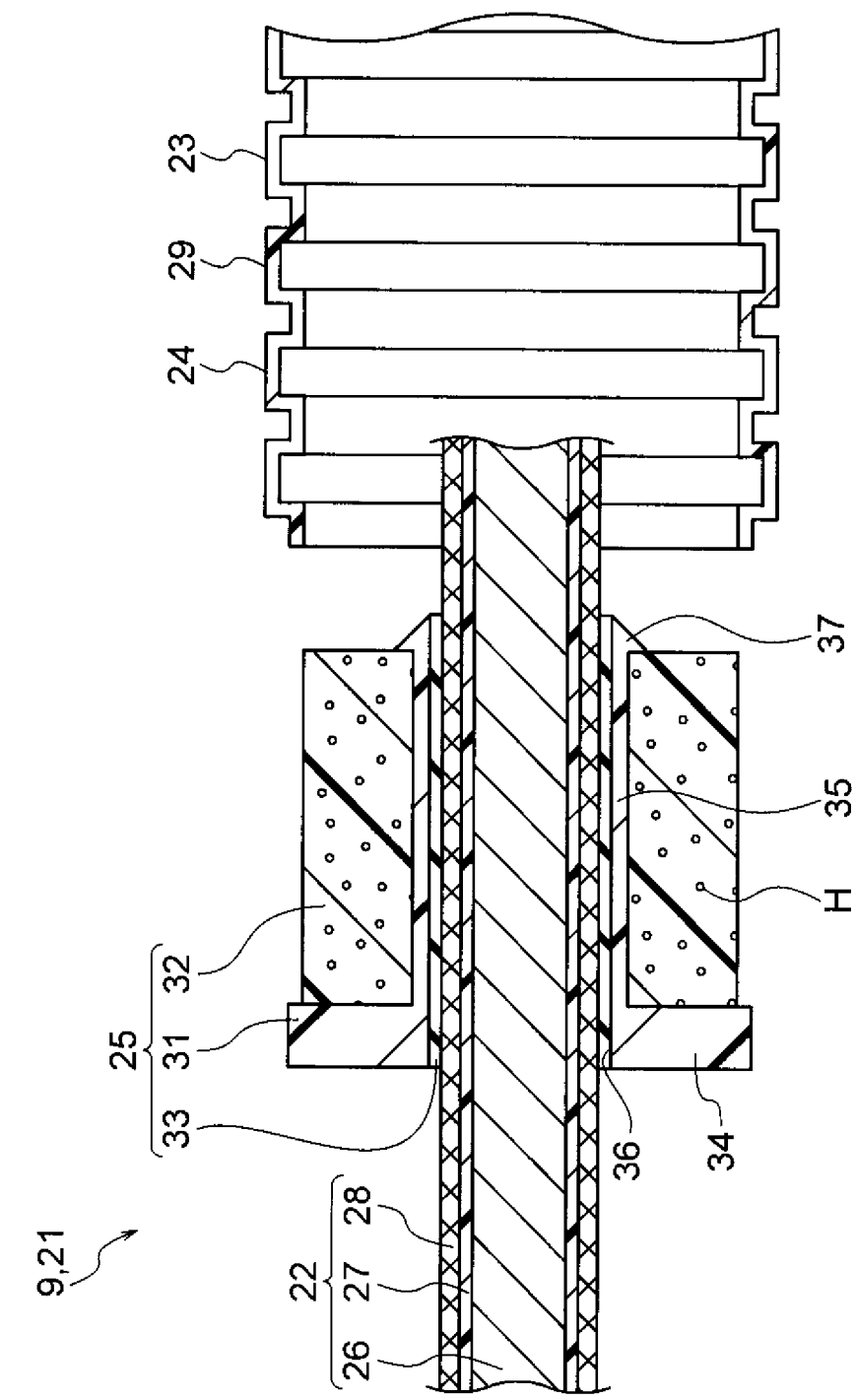
FIG. 7 is a sectional view illustrating a state immediately before attachment of the exterior member end cap to an end portion of an exterior member.

FIG. 4 is a view seen from an arrow A direction of FIG. 3. FIG. 5 is a sectional view taken along line B-B of FIG. 3. FIG. 6 is a view seen from an arrow C direction of FIG. 3. FIG. 7 is a sectional view illustrating a state immediately before attachment of the exterior member end cap to an end portion of an exterior member. FIGS. 8 to 12 are sectional views illustrating configurations of first to fifth comparative examples.

In the present embodiment, the present invention is adopted with respect to a wire harness routed in a hybrid car. The wire harness may be routed in an electric car, a general car traveling by using its engine, or the like.

Reference sign 1 in FIG. 1A stands for the hybrid car. The hybrid car 1 is a vehicle driven with power from an engine 2 and power from a motor unit 3 mixed. Electric power from a battery 5 (battery pack) is supplied to the motor unit 3 via an inverter unit 4. In the present embodiment, the engine 2, the motor unit 3, and the inverter unit 4 are mounted in an engine room 6, which is a position where front wheels and the like are present. The battery 5 is mounted in a car rear portion 7, where rear wheels and the like are present. The battery 5 may be mounted in a car room behind the engine room 6 as well.

The motor unit 3 and the inverter unit 4 are connected to each other by a high-voltage wire harness 8 (motor cable for a high voltage). The battery 5 and the inverter unit 4 are connected to each other by a high-voltage wire harness 9, too. An intermediate portion 10 of the wire harness 9 is routed on a vehicle floor underside 11 of the vehicle (car body). The intermediate portion 10 is routed substantially in parallel along the vehicle floor underside 11. The vehicle floor underside 11 is a known body (car body) and a so-called panel member. A through hole is formed at a predetermined position of the vehicle floor underside 11. The wire harness 9 is inserted into this through hole in a watertight manner.

The wire harness 9 and the battery 5 are connected to each other via a junction block 12 disposed on the battery 5. External connection means such as a shield connector 14 arranged at a harness terminal 13 on a rear end side of the wire harness 9 is electrically connected to the junction block 12. The wire harness 9 and the inverter unit 4 are electrically connected to each other via external connection means such as a shield connector 14 arranged at a harness terminal 13 on a front end side.

The motor unit 3 is configured to include a motor and a generator. The inverter unit 4 is configured to include an inverter and a converter in its configuration. The motor unit 3 is formed as a motor assembly including a shield case. The inverter unit 4 is formed as an inverter assembly including a shield case, too. The battery 5 is a modularized Ni-MH battery or Li-ion battery, and a power storage device such as a capacitor can be used as well. It is a matter of course that the battery 5 is not particularly limited insofar as it can be used in the hybrid car 1 and the electric car.

Reference sign 15 in FIG. 1B stands for a wire harness. The wire harness 15 is a low-voltage wire harness (for a low voltage) and is provided for a low-voltage battery 16 in the car rear portion 7 of the hybrid car 1 and auxiliary equipment 18 (equipment) mounted in a car front portion 17 to be electrically connected to each other. The wire harness 15 is routed through the vehicle floor underside 11 as is the case with the wire harness 9 illustrated in FIG. 1A. The wire harness 15 may be routed through a passenger compartment side. Reference sign 19 regarding to the wire harness 15 stands for a harness main body. Reference sign 20 stands for a connector.

As illustrated in FIGS. 1A and 1B, the high-voltage wire harnesses 8 and 9 and the low-voltage wire harness 15 are routed in the hybrid car 1. The present invention can be applied to any of the wire harnesses. In the following description, the high-voltage wire harness 9 will be described as a representative embodiment. A configuration and a structure of the wire harness 9 will be described first.

According to FIGS. 1A and 2, the elongated wire harness 9 routed through the vehicle floor underside 11 is configured to be provided with a harness main body 21 and the shield connectors 14 respectively arranged at both terminals (harness terminals 13) of the harness main body 21. The wire harness 9 is configured to be provided with a clamp C for its own routing at a predetermined position and a water-stopping member (not illustrated). The water-stopping member may be a grommet.

According to FIGS. 2 and 3, the harness main body 21 is configured to be provided with two elongated conductive paths 22, an exterior member 23 accommodating and protecting the two conductive paths 22, and an exterior member end cap 25 according to the present invention that is attached to an end portion 24 of the exterior member 23 from which the two conductive paths 22 are withdrawn. The number of the conductive paths 22 is an example. When it comes to the exterior member 23, one that has a structure accommodating and protecting the low-voltage wire harness 15 as well as the conductive paths 22 may be adopted as well.

According to FIGS. 2 and 3, the conductive path 22 is configured to be provided with a conductive conductor 26, an insulating insulator 27 with which the conductor 26 is coated, and a braid 28 (shield member) for exhibiting a shield function. In other words, a conductive path that has no sheath is adopted as the conductive path 22. The conductive path 22 has no sheath, thus the conductive path 22 is light in weight. The conductive path 22 is elongated, thus the conductive path 22 can be significantly lighter in weight than conventional examples.

The conductor 26 in FIGS. 3 and 4 is formed of copper and a copper alloy or aluminum and an aluminum alloy such that a circular cross section is given to it. The conductor 26 may be any one of a conductor that has a structure obtained by element wires being twisted together and a conductor that has a rod-shaped structure which has a rectangular or circular (rounded) cross section (such as a conductor structure with a normal-angle or circular single core, an electrical wire itself having a rod shape in this case). The insulator 27 formed from an insulating resin material is extrusion-molded on an outer surface of the conductor 26 described above.

The insulator 27 in FIGS. 3 and 4 is extrusion-molded on an outer peripheral surface of the conductor 26 by a thermoplastic resin material being used. The insulator 27 is formed as a coating that has a circular cross section. The insulator 27 is formed such that it has a predetermined thickness. Various types of known resins can be used as the thermoplastic resin mentioned above. For example, it is appropriately selected from polymer materials such as polyvinyl chloride resin, polyethylene resin, and polypropylene resin.

According to FIGS. 3 and 4, the braid 28 is disposed as an outermost layer of the conductive path 22. The braid 28, which has a tubular shape, is formed by knitting of conductive and extremely fine element wires. The braid 28 is formed such that it has a shape and a size allowing it to cover the entire outer peripheral surface leading from one end to the other end of the insulator 27. A metal foil or the like as well as the braid 28 may be used as a shield member, too.

The exterior member 23 in FIGS. 2 and 3 is formed by molding an insulating resin into the shape of a single and straight tubular body. The exterior member 23 has a straight shape before being used. In addition, the exterior member 23 has a shape with no abdominal cut as a result of the formation. The shape of the exterior member 23 has no slit, that is, the exterior member 23 is not a split tube. Furthermore, the exterior member 23 is formed such that it has a circular cross section in accordance with the shape of the conductive path 22.

The exterior member 23 has a flexible tube portion 29 that has flexibility and a straight tube portion 30 as a part for straight routing of the conductive path 22. In addition, entire part of the exterior member 23 may be the flexible tube portion 29. A plurality of the flexible tube portions 29 and a plurality of the straight tube portions 30 are formed in a tube axis direction. These flexible tube portions 29 and straight tube portions 30 are alternately placed and formed.

The flexible tube portion 29 in FIGS. 2 and 3 is placed in accordance with a vehicle attachment shape. The flexible tube portion 29 is placed in accordance with a shape of a wire harness routing destination and shape of an attachment target 38 (described later). In addition, the flexible tube portion 29 is formed such that it has a length fit to the vehicle attachment shape. The length of the flexible tube portion 29 is not constant and the flexible tube portion 29 is formed such that it has various required lengths in accordance with the vehicle attachment shape. The flexible tube portion 29 is formed such that it can be deflected at a desired angle in a packed state and during transport of the wire harness 9 and, in addition, during path routing to the vehicle. In other words, the flexible tube portion 29 is formed such that it is capable of having a bent shape after deflection, not to mention returning to its original state (state during resin molding) where it is straight as illustrated in the drawings. The flexible tube portion 29 according to the present embodiment is formed in the shape of a bellows tube that has a bellows recessed portion and a bellows projection portion.

The straight tube portion 30 in FIGS. 2 and 3 is formed as a part that has no flexibility unlike the flexible tube portion 29. The straight tube portion 30 is also formed as a part that is not bent in the packed state and during the transport and, in addition, during the path routing. The part that is not bent means a part that does not have flexibility in an active manner. The straight tube portion 30 is formed in the shape of a long and straight pipe. The straight tube portion 30 has an outer peripheral surface that has a shape with no unevenness.

The straight tube portion 30 is formed as a part more rigid than the flexible tube portion 29. The straight tube portion 30 has a position and a length fit to the vehicle attachment shape. In the present embodiment, the longest one of the plurality of straight tube portions 30 is formed as a part placed on the vehicle floor underside 11.

According to FIGS. 3 to 7, the exterior member end cap 25 includes a cap main body 31. The cap main body 31 may be made of resin. The cap main body 31 is disposed on the outside of the conductive path 22. The cap main body 31 is inserted into the exterior member 23. The exterior member end cap 25 includes an elastic first sealing member 32. The elastic first sealing member 32 is disposed on the outside of the cap main body 31. The exterior member end cap 25 includes an elastic second sealing member 33. The elastic second sealing member 33 is disposed on the inside of the cap main body 31. The exterior member end cap 25 is provided as a member that is capable of blocking infiltration of sand and the like into the exterior member 23 from the outside. In addition, the exterior member end cap 25 is provided as a member that is capable of removing moisture from an inner portion of the exterior member 23 when the moisture has accumulated in the inner portion of the exterior member 23.

The cap main body 31 in FIGS. 3 to 7 is a resin-molded article formed from an insulating resin material, has a lid portion 34 (34a and 34b) and an insertion portion 35 (35a and 35b), and is formed in, for example, the shape illustrated in the drawings. The reference signs of a and b are because the cap main body 31 according to the present embodiment is formed as a structure split into two (this is an example).

The lid portion 34 in FIGS. 3, 4, and 7 is formed as a circular plate-shaped part fit to the outer diameter of the exterior member 23. In addition, in a case that the exterior member 23 is formed in an elliptical shape for example, the lid portion 34 will be formed as an elliptical plate-shaped part in accordance with the elliptical shape of the exterior member 23. The lid portion 34 is formed such that it can be attached at a predetermined interval from the end portion 24 of the exterior member 23. A stopper or the like is formed for the predetermined interval although it is not particularly illustrated in the present embodiment.

<Regarding Insertion Portion 35>

The insertion portion 35 in FIGS. 3 to 7 is disposed on the outside of the conductive path 22. The insertion portion 35 pinches the conductive path 22. In addition, the insertion portion 35 is formed as a part that is inserted with an appropriate length into the exterior member 23. The insertion portion 35 is formed such that it has an elliptical cross section. Two through holes 36 (36a and 36b) and a turning prevention portion 37 (37a and 37b) are formed in the insertion portion 35. Since the insertion portion 35 according to the present embodiment has the through holes 36, it is formed as a part protruding in a substantially tubular shape.

The insertion portion 35 is formed as a part allowing the two conductive paths 22 to be placed or held along the central axis of the exterior member 23. The two conductive paths 22 have their positions determined by the insertion portion 35. Accordingly, the insertion portion 35 functions also as a part that is capable of regulating the shaking of the two conductive paths 22 at this part.

The two through holes 36 in FIGS. 3 to 7 are formed as parts that respectively pass through the cap main body 31 in a straight line and in a circle. In addition, each of the two through holes 36 is formed such that a space fit to the diameter of the conductive path 22 and the thickness of the second sealing member 33 is available. The two through holes 36 are placed and formed at positions symmetrical to the central axis of the cap main body 31.

According to FIGS. 3, 6, and 7, the turning prevention portion 37 is placed and formed at a protruding tip of the insertion portion 35. The turning prevention portion 37 is formed as a part for preventing the first sealing member 32 (described later) from turning. The turning prevention portion 37 is formed as an annular and substantially locking ridge part slightly protruding to the outside. The shape and the like are not particularly limited insofar as the turning can be prevented and the function of the first sealing member 32 is not hindered. The turning prevention portion 37 according to the present embodiment has a tapered surface and a locking surface with respect to the first sealing member 32 (reference signs of the two surfaces are omitted herein).

The first sealing member 32 in FIGS. 3, 5, 6, and 7 is an elastic member disposed on the outside of the insertion portion 35 and is formed such that it is in a state where it has a continuous bubble structure H. In the continuous bubble structure H, respective bubbles are connected to each other, therefore liquid and gas can pass through the structure. In the present embodiment, the first sealing member 32 is formed of foamed rubber. In addition, other than the foamed rubber, for example, polyurethane and polyolefin can be used as the continuous bubble structure H of the first sealing member 32. The first sealing member 32 serves to block infiltration of sand and the like into the exterior member 23 from the outside and to remove moisture from the inner portion of the exterior member 23 via the continuous bubble structure H part when the moisture has accumulated in the inner portion of the exterior member 23. The first sealing member 32 is shaped such that its inner peripheral surface is in close contact with the insertion portion 35 and its outer peripheral surface is in close contact with the exterior member 23. In addition, the first sealing member 32 is shaped such that it is in close contact with the lid portion 34 and caught by the turning prevention portion 37. Since the first sealing member 32 has the continuous bubble structure H as described above, the close contact mentioned above is not in a so-called watertight manner in the strict sense of the word.

The second sealing member 33 in FIGS. 3 to 7 is an elastic member disposed at the two through holes 36 and is formed such that it is in a state where at least a gap can be filled. Specifically, the second sealing member 33 is formed to fill a gap between inner peripheral surfaces of the two through holes 36 and outer peripheral surfaces of the two conductive paths 22. In other words, the second sealing member 33 fills a gap between the inner peripheral surfaces of the two through holes 36 and the outer peripheral surfaces of the braids 28. The second sealing member 33 serves to block infiltration of sand and the like into the exterior member 23 from the outside. The two functions described above may be given by the same material as the first sealing member 32 as well. The second sealing member 33 does not have to be disposed when infiltration of sand and the like is unlikely to occur.

The exterior member end cap 25 in FIGS. 3 and 7 is formed by the cap main body 31 being assembled with the two conductive paths 22 in a state where pinching is performed in an up-down direction in the drawing and in a state where the second sealing member 33 is interposed and then the first sealing member 32 being assembled outside the insertion portion 35. Then, the exterior member end cap 25 is inserted into the end portion 24 of the exterior member 23 in a state where the first sealing member 32 is to be exposed with a predetermined width W. Then, attachment is completed. The end portion 24 of the exterior member 23 is closed by the exterior member end cap 25, and, for example, infiltration of sand and the like into the exterior member 23 from the outside can be blocked. In addition, moisture can be removed to the outside from the part that has the predetermined width W when the moisture has accumulated in the exterior member 23.

Regarding the configuration and structure described above, the wire harness 9 is manufactured as follows (refer to FIGS. 2 and 3). The wire harness 9 is manufactured by insertion of the conductive path 22 from one end opening to the other end opening of the exterior member 23 resin-molded in a substantially linear shape as a whole. In addition, the wire harness 9 is manufactured by attachment of the clamp C, the grommet, a boot, or the like to a predetermined position of an outer surface of the exterior member 23. Furthermore, the wire harness 9 is manufactured by the exterior member end cap 25 being attached to the end portion 24 of the exterior member 23 or the shield connector 14 being disposed at a terminal part of the conductive path 22.

Packing of the wire harness 9 is completed once the predetermined flexible tube portion 29 is bent as if it is folded up after the manufacturing described above. The wire harness 9 in the packed state is compact and is transported to a vehicle assembly site in this compact state.

At the vehicle assembly site, the wire harness 9 is attached to the attachment target 38 of the vehicle from its elongated part corresponding to the vehicle floor underside 11. The straight tube portion 30, which is the longest in the exterior member 23, is placed at the elongated part of the wire harness 9 corresponding to the vehicle floor underside 11, and thus the wire harness 9 is attached in a state where deflection is suppressed. At this time, the wire harness 9 is attached with a high level of workability. After the elongated part corresponding to the vehicle floor underside 11 is fixed by the clamp C or the like, the flexible tube portion 29 part of the exterior member 23 is deflected (bent) and the residual part is attached at the same time. Once a series of work related to the attachment is completed, the wire harness 9 is put into a state where it is routed in a desired path.

As a result of the use of the exterior member end cap 25 described above with reference to FIGS. 1 to 7, mixing of sand and the like with the inner portion of the exterior member 23 can be made less likely than in a case where, for example, only tape winding is conducted. In addition, moisture removal from the inner portion of the exterior member 23 can be facilitated by the use of the exterior member end cap 25 when moisture has accumulated there. Accordingly, the present invention is capable of resulting in the prevention of damage to the conductive path 22 in the exterior member 23.

Advantages of the exterior member end cap 25 according to the present invention will be described below based on contrast with the first to fifth comparative examples illustrated in FIGS. 8 to 12.

Figure 8:
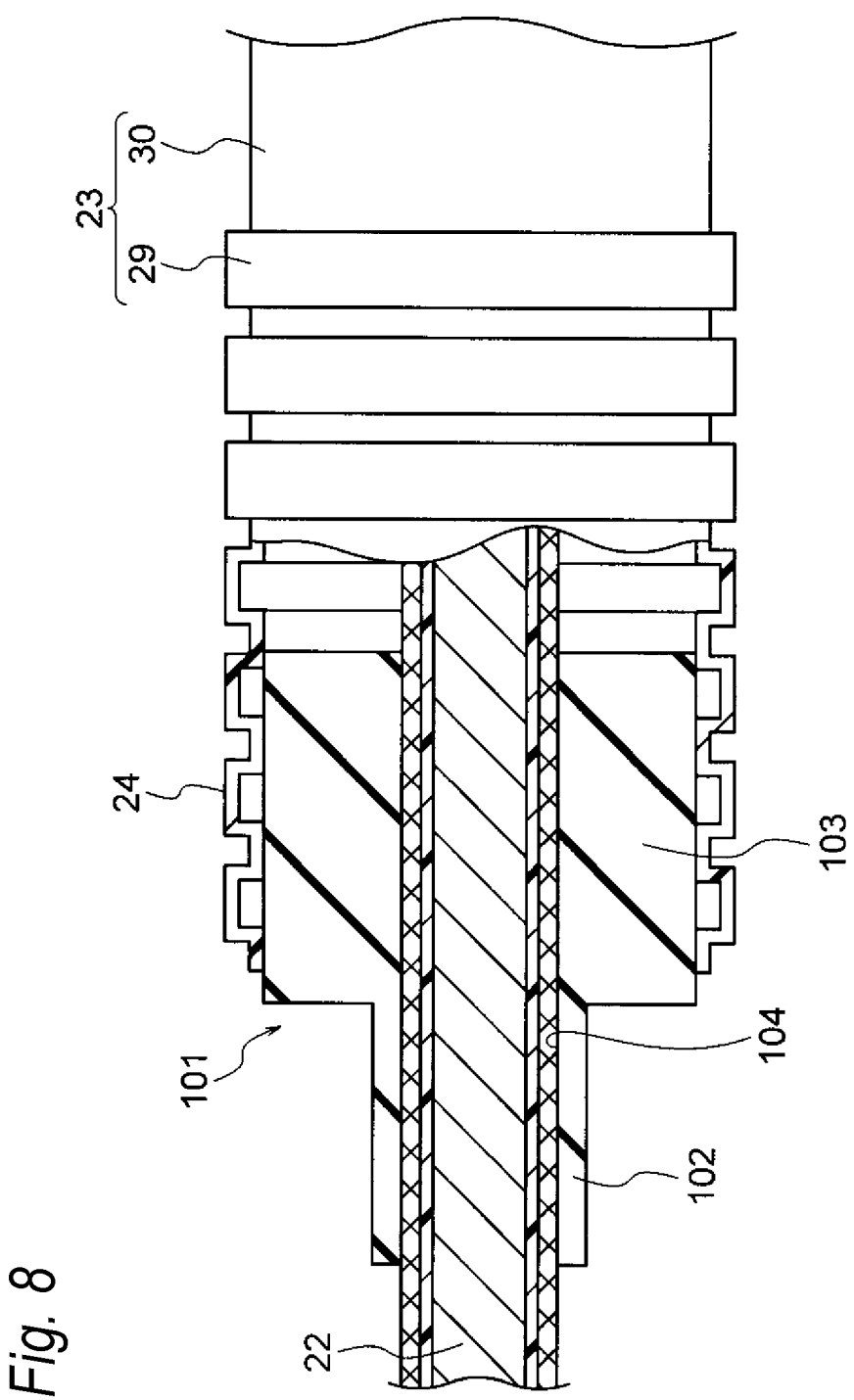
FIG. 8 is a sectional view illustrating a configuration of a first comparative example.

An exterior member end cap 101 (first comparative example) in FIG. 8, which is attached to the end portion 24 of the exterior member 23, is formed of an elastomer or rubber that has elasticity and has a small-diameter portion 102, a large-diameter portion 103 continuous to the small-diameter portion 102, and a conductive path insertion hole 104 formed through the small-diameter portion 102 and the large-diameter portion 103. The exterior member end cap 101 is formed as a so-called grommet-shaped exterior member end cap. The exterior member end cap 101 is inserted into the end portion 24 of the exterior member 23 in a state where the large-diameter portion 103 is slightly compressed. Then, attachment is completed by an outer peripheral surface of the large-diameter portion 103 coming into close contact with an inner peripheral surface of the exterior member 23 by a repulsive force.

The exterior member end cap 101 is capable of blocking infiltration of sand and the like into the exterior member 23 from the outside. However, the exterior member end cap 101 is incapable of removing moisture to the outside from the inner portion of the exterior member 23 when the moisture has accumulated in the exterior member 23. Accordingly, it can be appreciated that the present invention is more advantageous.

Figure 9:
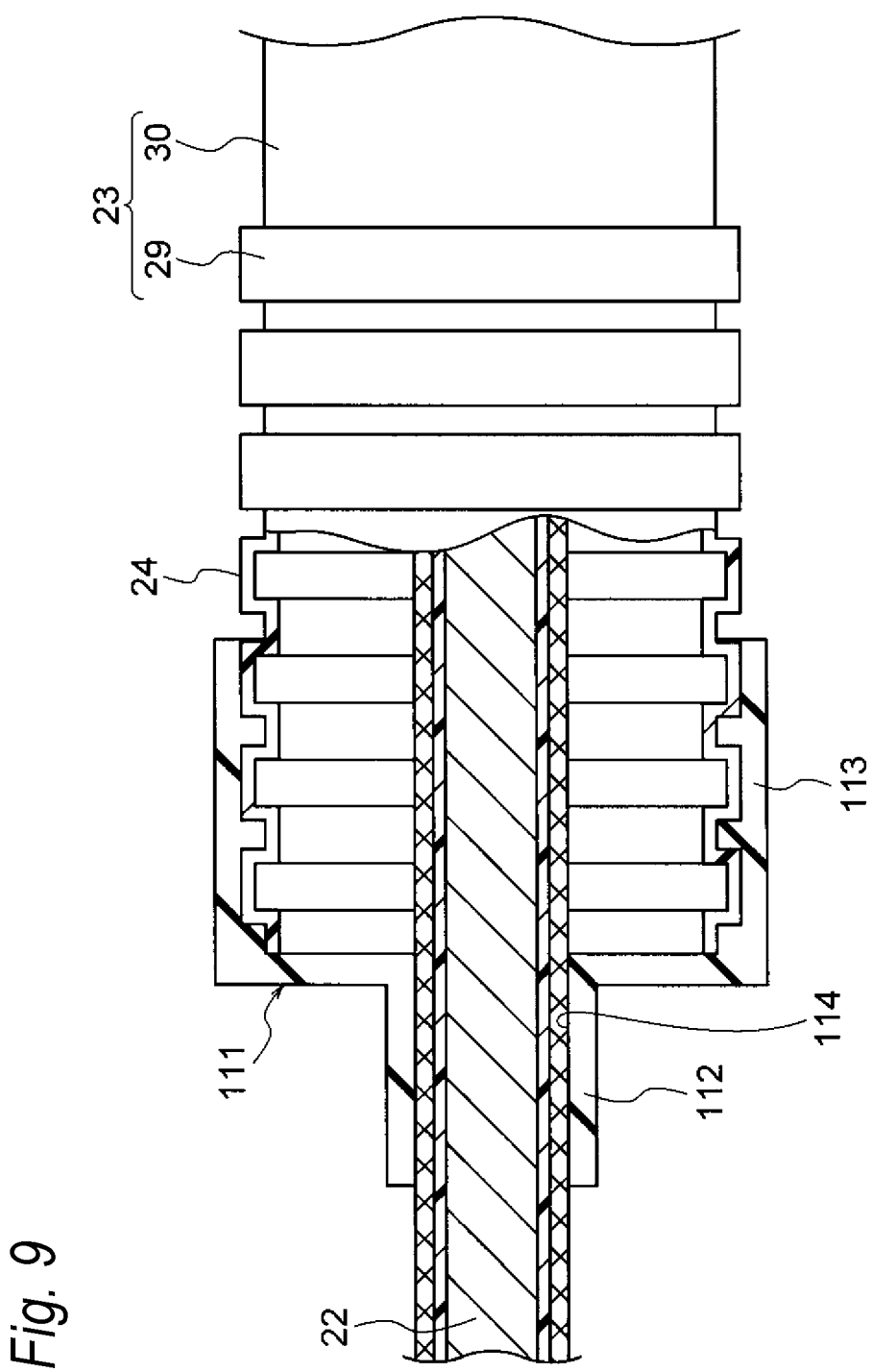
FIG. 9 is a sectional view illustrating a configuration of a second comparative example.

An exterior member end cap 111 (second comparative example) in FIG. 9, which is attached to the end portion 24 of the exterior member 23, is formed of an elastomer or rubber that has elasticity and has a small-diameter portion 112, a large-diameter portion 113 continuous to the small-diameter portion 112, and a conductive path insertion hole 114 formed through the small-diameter portion 112. The exterior member end cap 111 is formed as a so-called grommet-shaped exterior member end cap and a so-called boot-shaped exterior member end cap. The exterior member end cap 111 is fitted on the outside of the end portion 24 of the exterior member 23 in a state where the large-diameter portion 113 is slightly expanded. Then, attachment is completed by the exterior member end cap 111 coming into close contact with the end portion 24.

The exterior member end cap 111 is also capable of blocking infiltration of sand and the like into the exterior member 23 from the outside. However, the exterior member end cap 111 is incapable of removing moisture to the outside from the inner portion of the exterior member 23 when the moisture has accumulated in the exterior member 23. Accordingly, it can be appreciated that the present invention is more advantageous.

Figure 10:
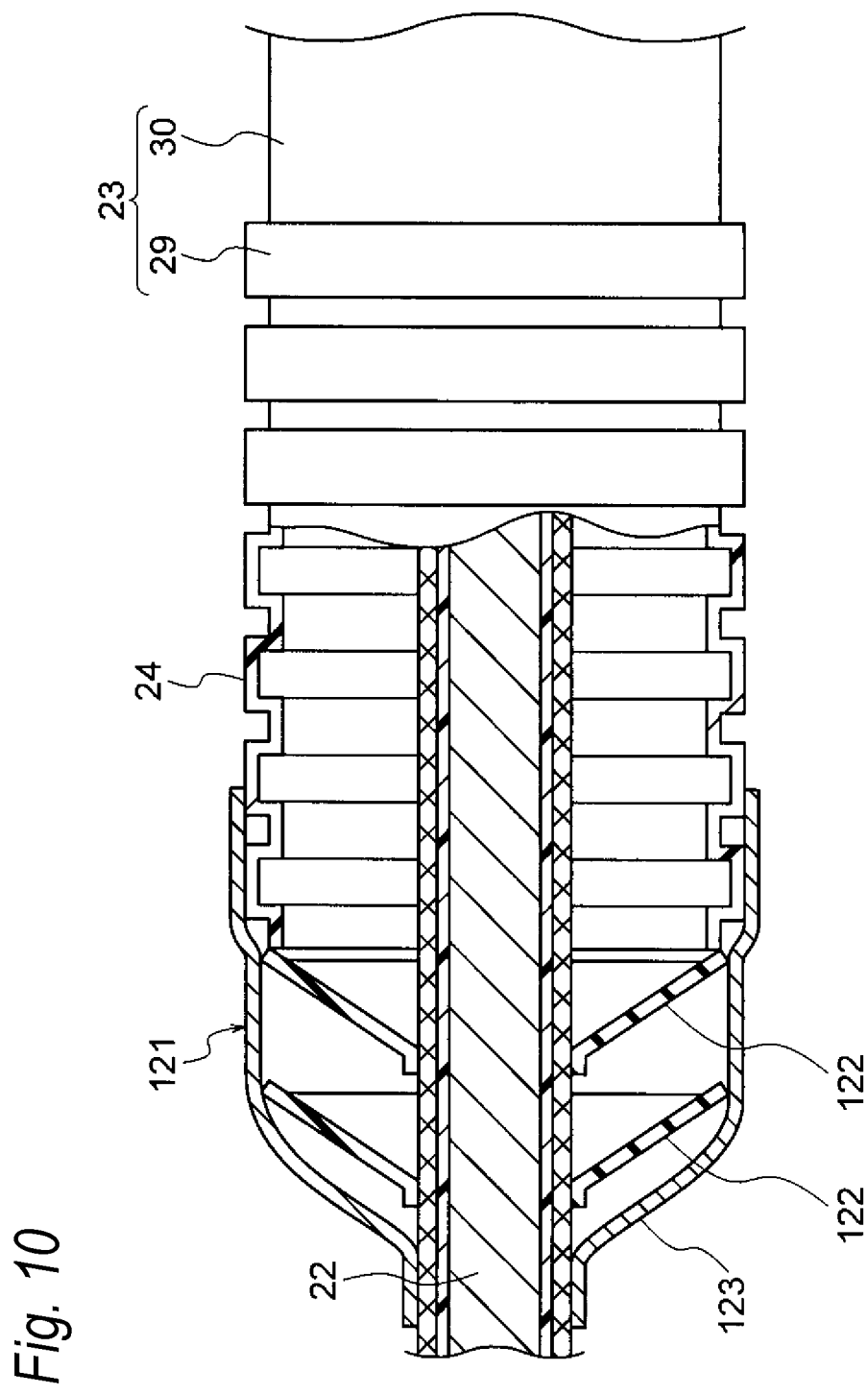
FIG. 10 is a sectional view illustrating a configuration of a third comparative example.

An exterior member end cap 121 (third comparative example) in FIG. 10, which is attached to the end portion 24 of the exterior member 23, has a plurality of umbrella-shaped members 122 and a tape winding 123 and is formed in the shape that is illustrated in the drawing. The umbrella-shaped members 122 are formed such that they function as return parts inside the tape winding 123. The tape winding 123 is formed such that it is in a state where it is wound downward from the end portion 24 of the exterior member 23 to the conductive path 22.

The exterior member end cap 121 is also capable of blocking infiltration of sand and the like into the exterior member 23 from the outside. However, the exterior member end cap 121 is incapable of removing moisture to the outside from the inner portion of the exterior member 23 when the moisture has accumulated in the exterior member 23. Accordingly, it can be appreciated that the present invention is more advantageous.

Figure 11:
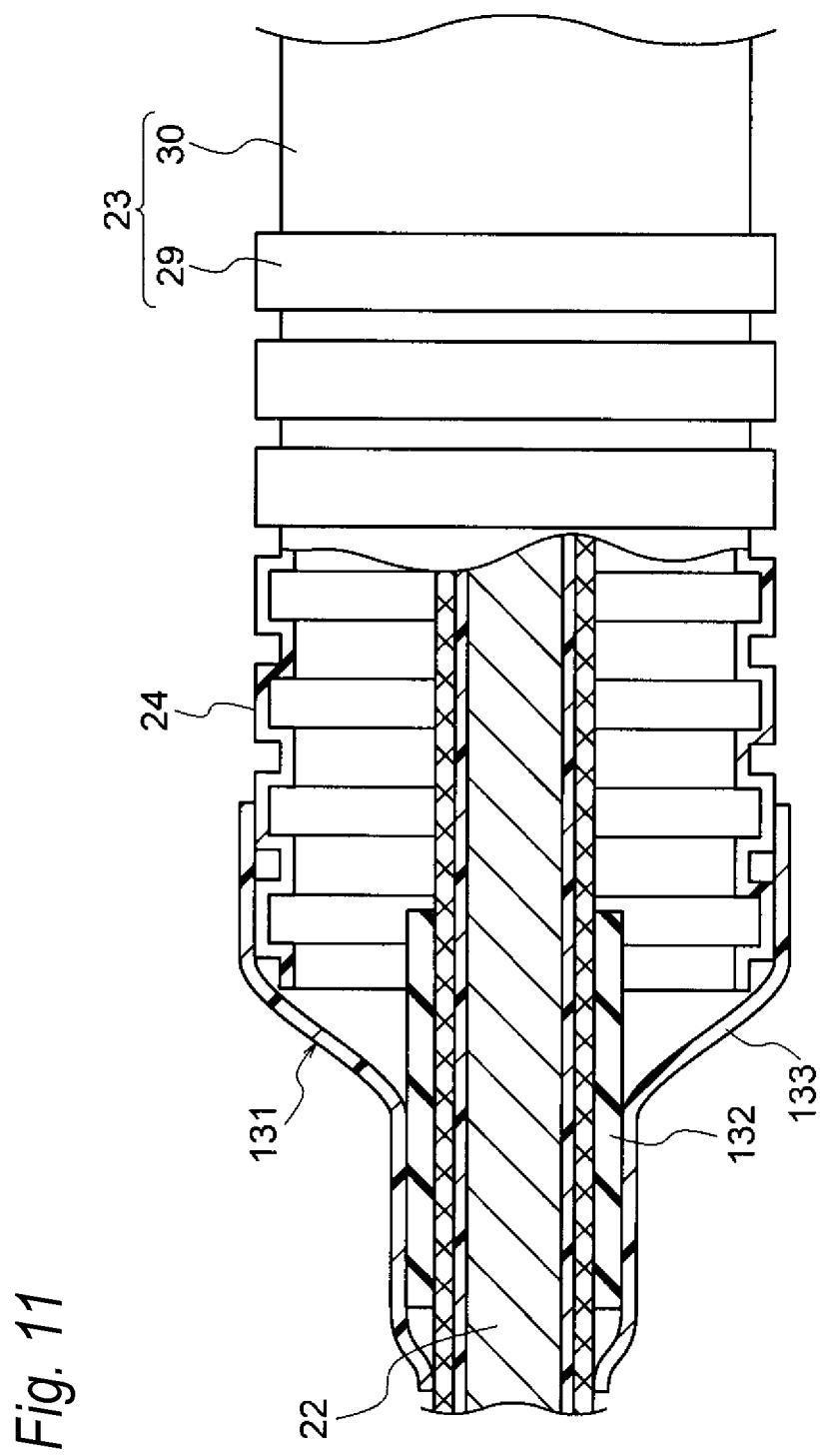
FIG. 11 is a sectional view illustrating a configuration of a fourth comparative example.

An exterior member end cap 131 (fourth comparative example) in FIG. 11, which is attached to the end portion 24 of the exterior member 23, has a tubular member 132 that has elasticity and comes into close contact with the conductive path 22 and a heat-shrinkable tube 133 and is formed in the shape that is illustrated in the drawing. The heat-shrinkable tube 133 is formed by a state where it provides covering from the end portion 24 of the exterior member 23 to the conductive path 22 (or to the tubular member 132) being achieved and it being shrunk by heat.

The exterior member end cap 131 is also capable of blocking infiltration of sand and the like into the exterior member 23 from the outside. However, the exterior member end cap 131 is incapable of removing moisture to the outside from the inner portion of the exterior member 23 when the moisture has accumulated in the exterior member 23. Accordingly, it can be appreciated that the present invention is more advantageous.

Figure 12:
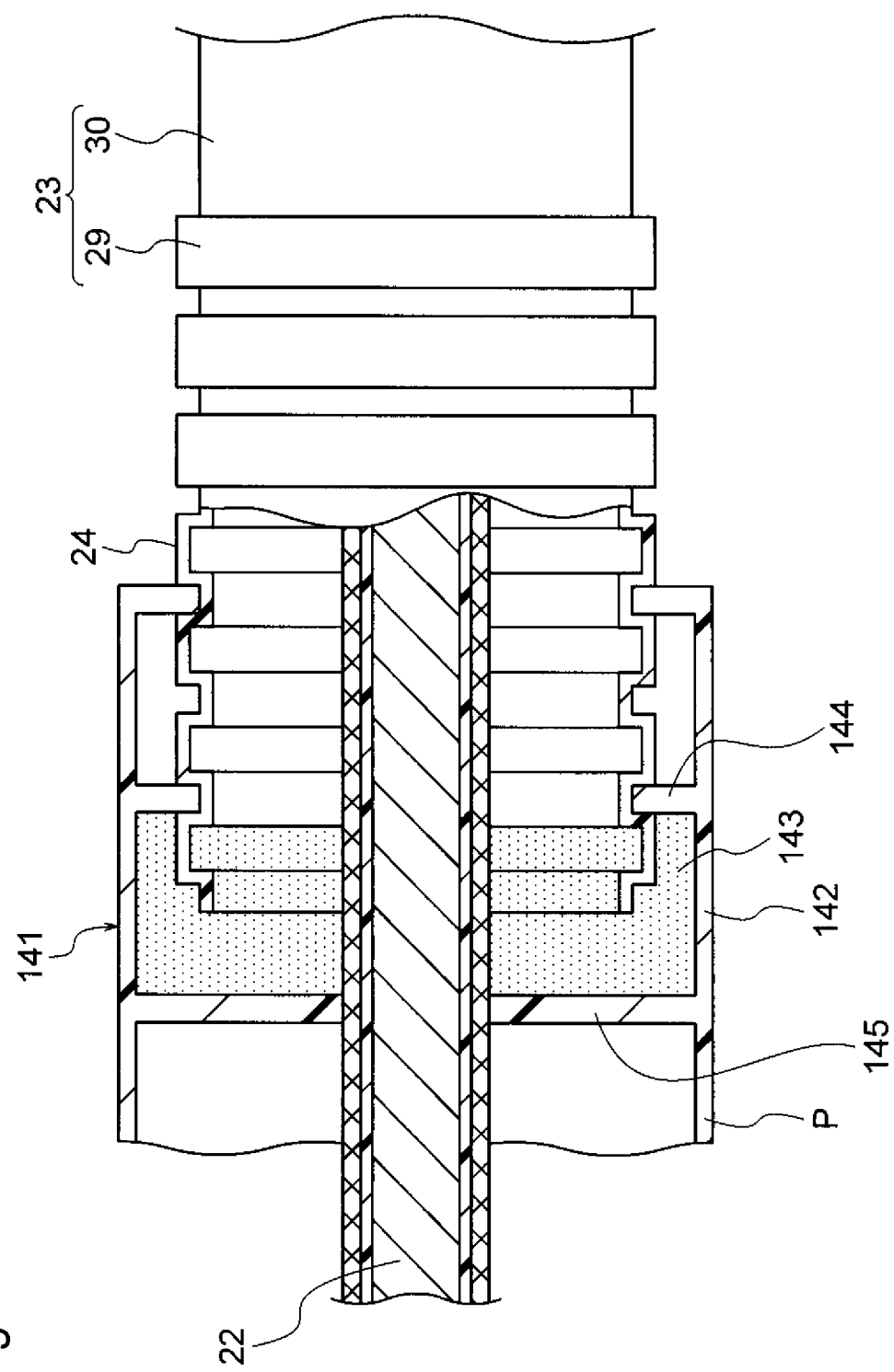
FIG. 12 is a sectional view illustrating a configuration of a fifth comparative example.

An exterior member end cap 141 (fifth comparative example) in FIG. 12, which is attached to the end portion 24 of the exterior member 23, has an end portion accommodating portion 142 formed as a box-shaped exterior member such as a protector P and a silicon material 143 with which the end portion accommodating portion 142 is filled and is formed in the shape that is illustrated in the drawing. A projection portion 144 is formed in the end portion accommodating portion 142 and the projection portion 144 is fitted into a bellows recessed portion of the end portion 24 from the outside of the exterior member 23. A wall 145 is formed in the end portion accommodating portion 142, too. The conductive path 22 passes through the wall 145.

The exterior member end cap 141 is also capable of blocking infiltration of sand and the like into the exterior member 23 from the outside. However, the exterior member end cap 141 is incapable of removing moisture to the outside from the inner portion of the exterior member 23 when the moisture has accumulated in the exterior member 23. Accordingly, it can be appreciated that the present invention is more advantageous.

Figure 13:
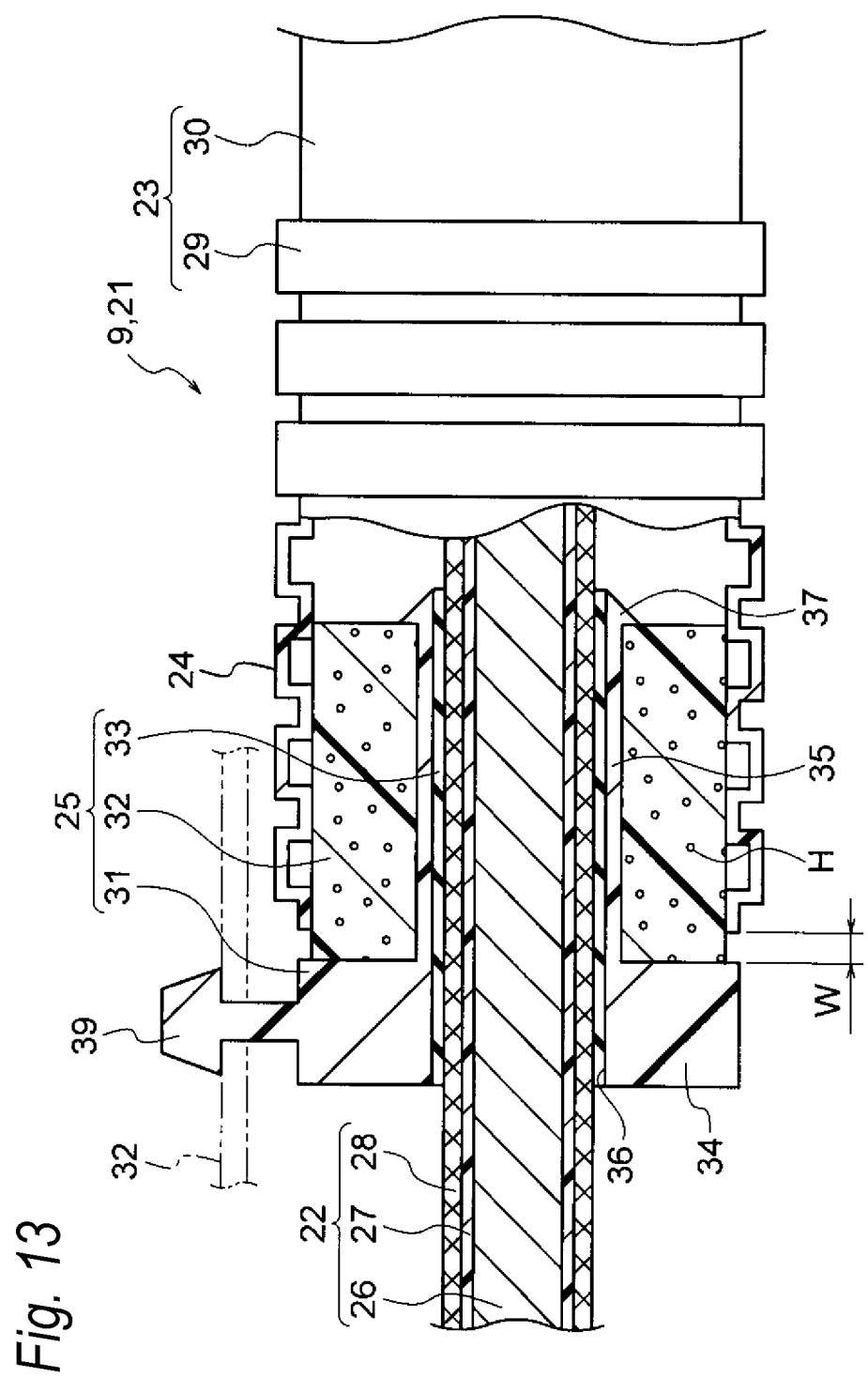
FIG. 13 is a sectional view illustrating a configuration of an exterior member end cap according to another embodiment of the present invention (second embodiment).

Hereinafter, a second embodiment will be described with reference to an accompanying drawing. FIG. 13 is a sectional view illustrating a configuration of an exterior member end cap according to this embodiment that is another example of the present invention. The same reference numerals will be used to refer to its constituting members basically the same as those of the first embodiment and detailed description thereof will be omitted.

According to FIG. 13, the exterior member end cap 25 is configured to include the cap main body 31, the first sealing member 32, and the second sealing member 33. A clip portion 39 (fixing portion) is integrally formed on the lid portion 34 of the cap main body 31 so that the exterior member 23 is fixed to the attachment target 38 (structure) during path routing. With the second embodiment, the exterior member 23 can be fixed even without the use of dedicated fixing portion and a stabilized path routing state can be achieved.

Figure 14:
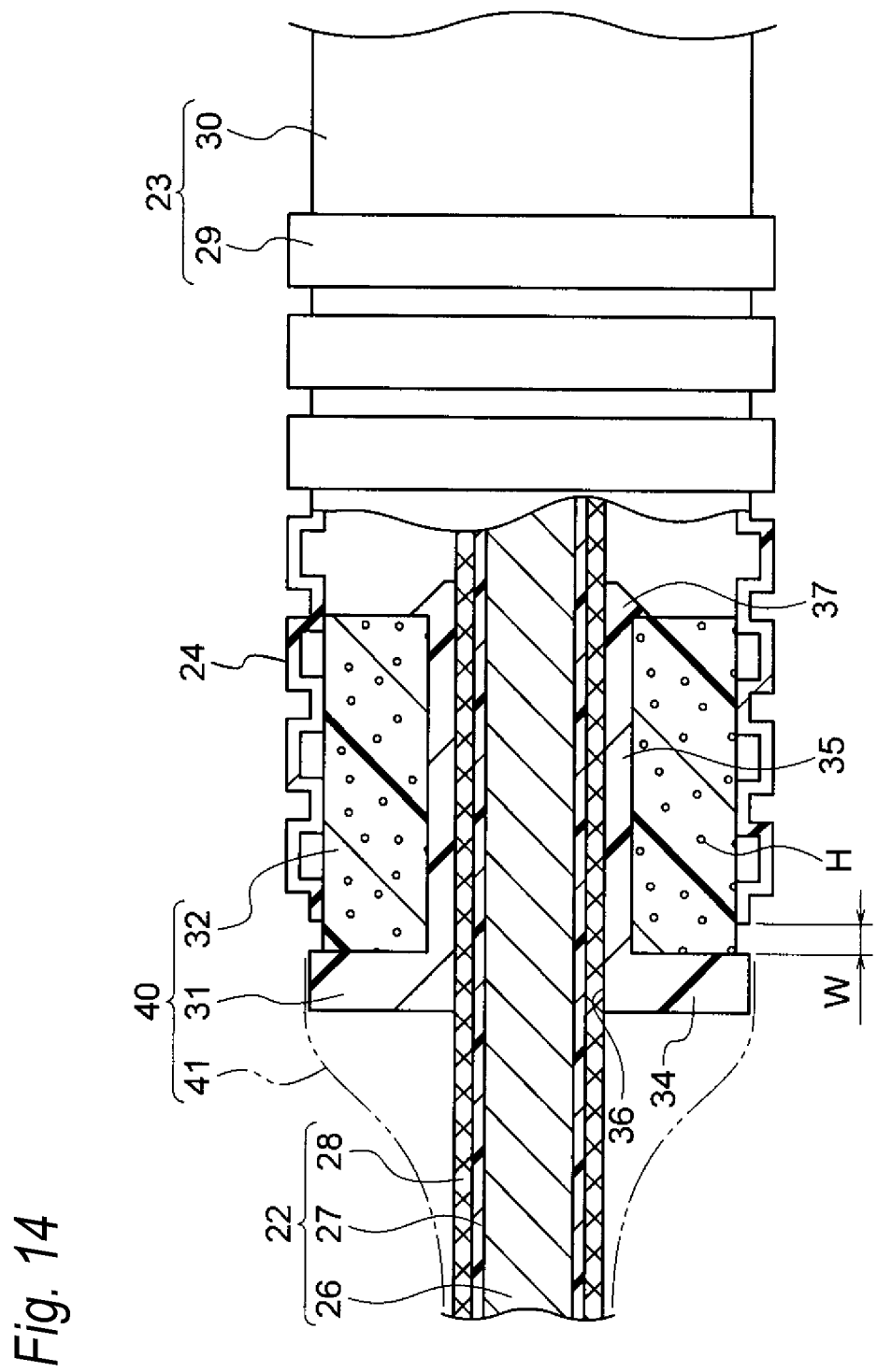
FIG. 14 is a sectional view illustrating a configuration of an exterior member end cap according to another embodiment of the present invention (third embodiment).

Hereinafter, a third embodiment will be described with reference to an accompanying drawing. FIG. 14 is a sectional view illustrating a configuration of an exterior member end cap according to this embodiment that is still another example of the present invention. The same reference numerals will be used to refer to its constituting members basically the same as those of the first embodiment and detailed description thereof will be omitted.

According to FIG. 14, an exterior member end cap 40 is configured to include the cap main body 31, the first sealing member 32, and a tape winding 41. The second sealing member 33 according to the first embodiment (refer to FIG. 3) is not disposed in the third embodiment. Instead, the tape winding 41 is applied to it just in case. As is seen in the drawing, the first sealing member 32 is exposed with the predetermined width W, and thus it is a matter of course that the first and third embodiments are similar in effect to each other.

Figure 15:
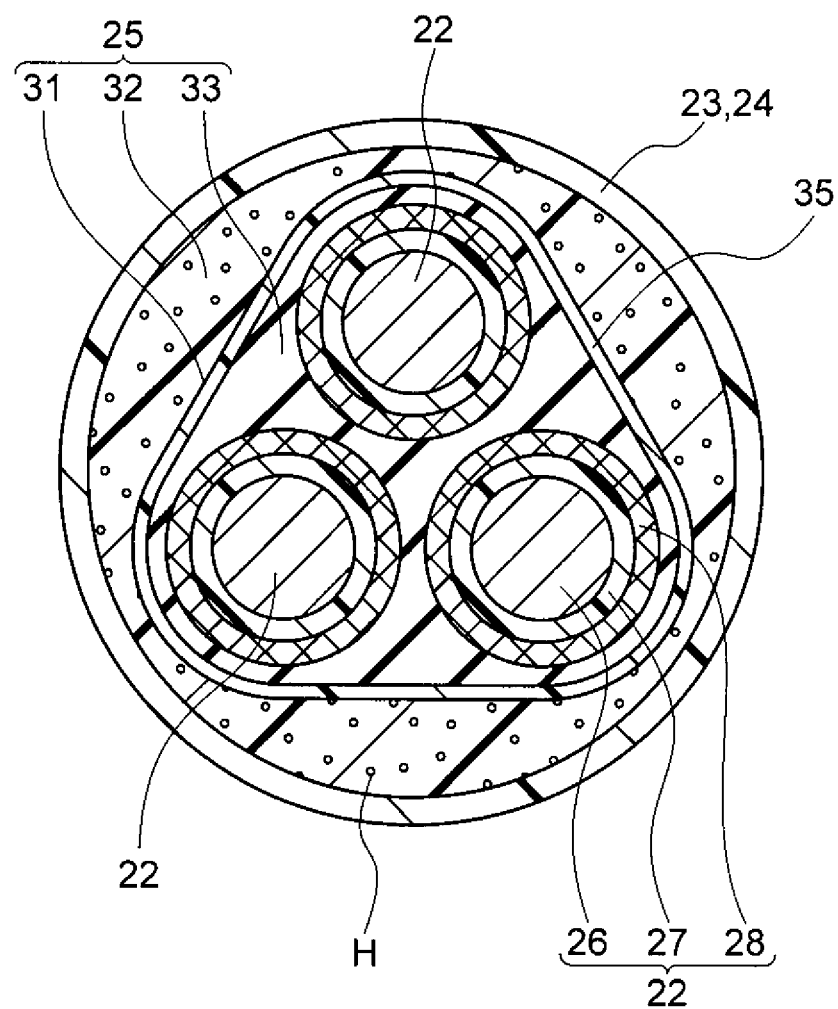
FIG. 15 is a sectional view illustrating a configuration of an exterior member end cap according to another embodiment of the present invention (fourth embodiment).

Hereinafter, a fourth embodiment will be described with reference to an accompanying drawing. FIG. 15 is a sectional view illustrating a configuration of an exterior member end cap according to this embodiment that is still another example of the present invention. The same reference numerals will be used to refer to its constituting members basically the same as those of the first embodiment and detailed description thereof will be omitted.

FIG. 15 shows a state where a cross section of the end portion 24 of the exterior member 23 at a time when three conductive paths 22 are used is seen. Reference sign 35 stands for the insertion portion. Reference sign 32 stands for the first sealing member. Reference sign 33 stands for the second sealing member. The present invention is still applicable even after an increase in the number of the conductive paths 22.

It is a matter of course that the present invention can be realized in various modified forms without departing from the spirit of the present invention.

In view of the above, according to an aspect of the invention, there is provided the wire harness described as (i) to (vi) below.

(i) An exterior member end cap (25), configured to be attached to an end portion (24) of a tubular shaped exterior member (23) from which at least one conductive path (22) is withdrawn, the exterior member end cap (25) including:
a cap main body (31) configured to be inserted into the exterior member (23) from the end portion (24) so as to be disposed on an outside of the conductive path (22); and
a first sealing member (32) having a elasticity, disposed on an outside of the cap main body (31) in close contact with an outer peripheral surface of the cap main body (31), configured to be close contact with an inner peripheral surface of the exterior member (23), and having a continuous bubble structure (H).

(ii) The exterior member end cap (25) as set forth in the above (i), wherein
the cap main body (31) includes a turning prevention portion (37) configured to prevent the first sealing member (32) from turning when the first sealing member (32) is inserted into the exterior member (23), and
the turning prevention portion (37) is formed on the outer peripheral surface of the cap main body (31).

(iii) The exterior member end cap (25) as set forth in the above (i), further including
a second sealing member (33) having elasticity and provided in a through hole (36) formed in the cap main body (31),
wherein the second sealing member (33) is configured to fill a gap between an inner peripheral surface of the through hole (36) and an outer peripheral surface of the conductive path (22) in a state that the conductive path (22) is inserted through the through hole (36).

(iv) The exterior member end cap (25) as set forth in the above (i), further including:
a fixing portion (39) configured to be fixed with a vehicle structure (38) when the exterior member (23) is routed to a path in a vehicle (1).

(v) The exterior member end cap (25) as set forth in the above (iv), wherein
the fixing portion (39) is formed on the cap main body (31).

(vi) A wire harness (8, 9) including:
a tubular shaped exterior member (23);
at least one conductive path (22) inserted into the exterior member (23) so as to be protected by the exterior member (23); and
the exterior member end cap (25) as set forth in the above (i), wherein
the exterior member end cap (25) is attached to an end portion (24) of the exterior member (23) from which the conductive path (22) is withdrawn, and
a part of the first sealing member (32) of the exterior member end cap (25) is exposed from the end portion (24) of the exterior member (25).

According to the present invention described above, the exterior member end cap closes the end portion of the exterior member and the first sealing member of the exterior member end cap is in close contact with the inner peripheral surface of the exterior member, and thus infiltration of sand and the like into the exterior member from the outside can be blocked. In addition, according to the present invention, the first sealing member of the exterior member end cap is formed such that it is in a state where it has the continuous bubble structure, and thus moisture can be removed to the outside from an inner portion of the exterior member via the continuous bubble structure part when the moisture has accumulated in the exterior member.

According to the present invention described above, the cap main body has the turning prevention portion, and thus the first sealing member can be inserted without turning when the exterior member end cap is attached to the end portion of the exterior member.

According to the present invention described above, a state is achieved where the second sealing member of the exterior member end cap provides filling between the cap main body and the outer peripheral surface of the conductive path, and thus infiltration of sand and the like into the exterior member from the outside can be blocked.

According to the present invention described above, the exterior member end cap can be given a function as a clamp, a clip portion, or the like.

According to the present invention described above, the wire harness includes the exterior member end cap in its configuration, and thus infiltration of sand and the like into the exterior member from the outside can be blocked. In addition, moisture can be removed to the outside from an inner portion of the exterior member via a continuous bubble structure part when the moisture has accumulated in the exterior member.

According to the present invention, mixing of sand and the like with the inner portion of the exterior member can be made less likely than in a case where, for example, only tape winding is conducted as a result of the use of the exterior member end cap. In addition, moisture accumulating in the exterior member can be removed with ease. Accordingly, the present invention is capable of resulting in the prevention of damage to the conductive path in the exterior member.

According to the present invention, the turning prevention portion is formed in the cap main body, and thus the cap main body can be inserted and turning of the first sealing member can be prevented at the same time during attachment of the exterior member end cap to the exterior member. Accordingly, the present invention is capable of achieving a reliable attachment of the exterior member end cap to the exterior member as well as the effect according to the first aspect.

According to the present invention, the second sealing member is included in the configuration, and thus mixing of sand and the like with the inner portion of the exterior member can be made even less likely.

According to the present invention, the function as the clamp, the clip portion, or the like can be given. As a result, the exterior member can be fixed to the structure even without the use of extra fixing portion.

According to the present invention, the wire harness includes the exterior member end cap in its configuration, and thus damage to the conductive path in the exterior member can be prevented.

What is claimed is:

1. An exterior member end cap, configured to be attached to an end portion of a tubular shaped exterior member from which at least one conductive path is withdrawn, the exterior member end cap comprising:
    a cap main body configured to be inserted into the exterior member from the end portion so as to be disposed on an outside of the conductive path; and
    a first sealing member having a elasticity, disposed on an outside of the cap main body in close contact with an outer peripheral surface of the cap main body, configured to be close contact with an inner peripheral surface of the exterior member, and having a continuous bubble structure.

2. The exterior member end cap as set forth in claim 1, wherein
    the cap main body includes a turning prevention portion configured to prevent the first sealing member from turning when the first sealing member is inserted into the exterior member, and
    the turning prevention portion is formed on the outer peripheral surface of the cap main body.

3. The exterior member end cap as set forth in claim 1, further comprising
    a second sealing member having elasticity and provided in a through hole formed in the cap main body,
    wherein the second sealing member is configured to fill a gap between an inner peripheral surface of the through hole and an outer peripheral surface of the conductive path in a state that the conductive path is inserted through the through hole.

4. The exterior member end cap as set forth in claim 1, further comprising:
    a fixing portion configured to be fixed with a vehicle structure when the exterior member is routed to a path in a vehicle.

5. The exterior member end cap as set forth in claim 4, wherein
    the fixing portion is formed on the cap main body.

6. A wire harness comprising:
    a tubular shaped exterior member;
    at least one conductive path inserted into the exterior member so as to be protected by the exterior member; and
    the exterior member end cap as set forth in claim 1, wherein
    the exterior member end cap is attached to an end portion of the exterior member from which the conductive path is withdrawn, and
    a part of the first sealing member of the exterior member end cap is exposed from the end portion of the exterior member.

* * * * *